United States Patent
Mattson et al.

(10) Patent No.: US 9,122,818 B2
(45) Date of Patent: Sep. 1, 2015

(54) REPRESENTATION AND DISCOVERY OF GEOMETRIC RELATIONSHIPS IN A THREE DIMENSIONAL MODEL

(75) Inventors: Howard Charles Duncan Mattson, Cambridge (GB); Douglas Joseph King, Peterborough (GB); Yanong Zhu, Cambridge (GB); Neil James Foston, Cambridge (GB)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 464 days.

(21) Appl. No.: 13/529,061

(22) Filed: Jun. 21, 2012

(65) Prior Publication Data
US 2013/0342532 A1    Dec. 26, 2013

(51) Int. Cl.
*G06F 17/50*    (2006.01)

(52) U.S. Cl.
CPC ............ *G06F 17/50* (2013.01); *G06F 2217/06* (2013.01)

(58) Field of Classification Search
CPC ................................ G06T 19/00; G06T 19/20
See application file for complete search history.

(56) References Cited

U.S. PATENT DOCUMENTS

| | | | |
|---|---|---|---|
| 6,052,691 A | 4/2000 | Ardoin et al. | |
| 2008/0252663 A1* | 10/2008 | Kripac et al. | 345/681 |

OTHER PUBLICATIONS

Borning et al., "Constraint Hierarchies," 1992, Lisp and Symbolic Computation, vol. 5, No. 3.*
"Interaction with Constraints in 3D Modeling," XP040054129; Sohrt, et al. Published in Proceedings. Symposium on Solid Modeling Foundations and CAD/CAM Applications, Jun. 5, 1991 (pp. 387-396) (10 pages).
Gleicher; "A Differential Approach to Graphical Interaction;" XP055006254; p. 74, paragraph 3—p. 75, paragraph 1, p. 178, paragraphs 4-5 (262 pages).
International Search Report of Application No. PCT/US2013/046473 dated Oct. 8, 2013 (14 pages).

* cited by examiner

*Primary Examiner* — Kee M Tung
*Assistant Examiner* — Ryan D McCulley (57) ABSTRACT

Systems and methods for maintaining equivalence relations in product data management (PDM) systems. A method includes receiving a 3D model including a plurality of components, and receiving a selection of one of the plurality of components of the model. The method includes receiving a selection of at least one equivalence relation to be discovered in the 3D model and identifying at least one target component of the plurality of components of the model. The method includes completing the selected component with respect to each target component according to each selected equivalence relation. The method includes building and storing an equivalence relationship graph according to the completed selected component.

20 Claims, 6 Drawing Sheets

REPRESENTATION AND DISCOVERY OF GEOMETRIC RELATIONSHIPS IN A THREE DIMENSIONAL MODEL

CROSS-REFERENCE TO OTHER APPLICATION

This application has some subject matter in common with U.S. patent application Ser. No. 13/529,066, filed concurrently herewith, for "Symmetry of Discovered Geometric Relationships in a Three-Dimensional Model", which is hereby incorporated by reference.

TECHNICAL FIELD

The present disclosure is directed, in general, to computer-aided design, visualization, and manufacturing systems, product lifecycle management ("PLM") systems, and similar systems, that manage data for products and other items (collectively, "Product Data Management" systems or "PDM" systems).

BACKGROUND OF THE DISCLOSURE

PDM systems manage PLM and other data. Improved systems are desirable.

SUMMARY OF THE DISCLOSURE

Various disclosed embodiments include systems and methods for improved PDM processes, including systems and methods for maintaining equivalence relations in product data management (PDM) systems. A method includes receiving a 3D model including a plurality of components and receiving a selection of one of the plurality of components of the model. The method includes receiving a selection of at least one equivalence relation to be discovered in the 3D model and identifying at least one target component of the plurality of components of the model. The method includes completing the selected component with respect to each target component according to each selected equivalence relation. The method includes building and storing an equivalence relationship graph according to the completed selected component.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Geometric relationship recognition allows users to edit models while retaining important design features, even on non-native or imported models.

Given any three-dimensional (3D) CAD model, there are many geometric relationships that the user may wish to keep when edits are made. For example, the user may wish to maintain certain distances between two features, for features to be "mirrored" or symmetrical about an arbitrary line or plane, for features to be maintained as parallel, or otherwise.

As models increase in size, the number of relationships increases dramatically, with some relationship types, such as "parallel", increasing in complexity by the square of the number of geometries involved. This makes efficient representation and discovery of these relationships an important part of ensuring that the PDM representation scales to real user models.

Disclosed embodiments include systems and methods for efficient representation and discovery of geometric relationships in a 3D model. Some embodiments incorporate Equivalence Classes (ECs) to compress and optimize the representation of these relationships and to aid their efficient discovery within the model.

Figure 1:
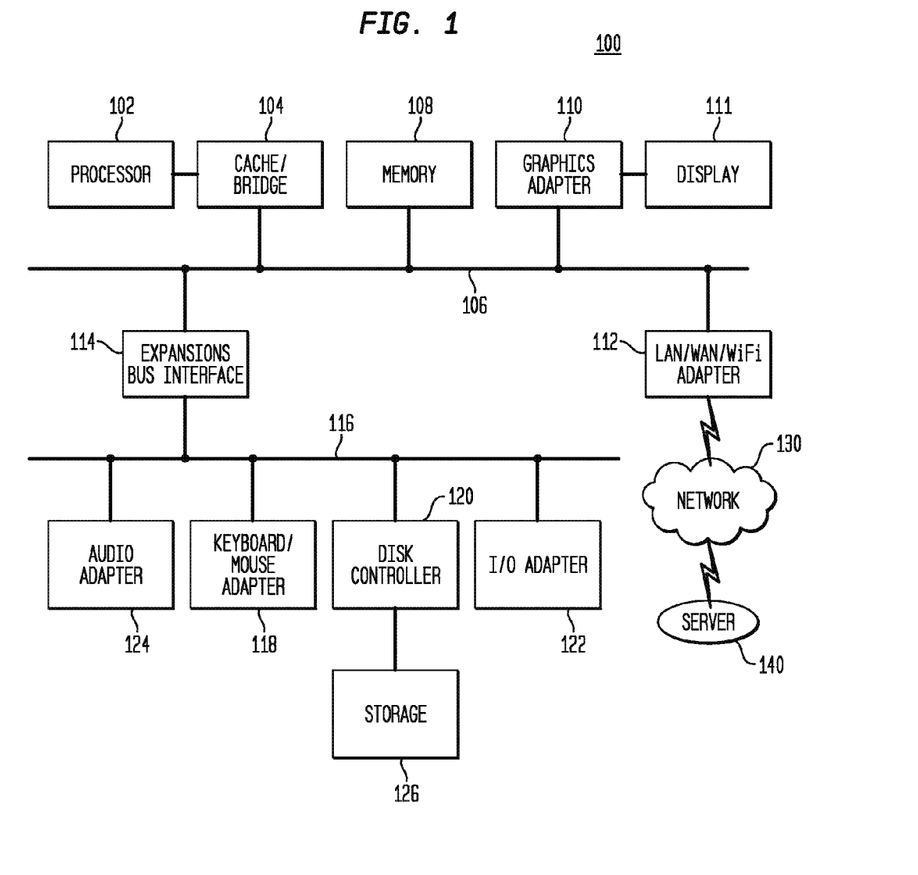
FIG. 1 depicts a block diagram of a data processing system in which an embodiment can be implemented.

FIG. 1 depicts a block diagram of a data processing system in which an embodiment can be implemented, for example as a PDM system or clearance system particularly configured by software or otherwise to perform the processes as described herein, and in particular, as each one of a plurality of interconnected and communicating systems as described herein. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

The mathematical definition of an equivalence class, as used herein, is a set of members that share an equivalence relation. Equivalence relations are reflexive, symmetric, and transitive. Equivalence classes have the useful property that an element may only be a member of one equivalence class defined by a particular equivalence relation.

Equivalence classes can therefore be used to define geometric relationships within a CAD model where those relationships are equivalence relations.

Equivalence relations exist in a model where geometries share at least one equal component; the components for an equivalence relation are center, axis, plane, direction, radius, minor radius, or half angle.

The following equivalence relations are of use in geometric modeling according to disclosed techniques:

Identical (I): Geometries share the same type and all components.

Same center (SC): Geometries share the same centre component.

Same axis (SA): Geometries share the same axis component.

Same plane (SP): Geometries share the same plane component.

Same shape (SS): Geometries that share the same type, and same radius, major and minor radii, or half angle component.

Same direction (SD): Geometries share the same direction, aligned or anti-aligned.

From these equivalence relations, classes containing geometries can be formed that share the same equivalence relation.

There is a hierarchical structure among these ECs, as listed above, with Identical being the lowest, then Same-centre, Same-axis, Same-plane and Same-shape, and finally, Same-direction at the top.

Figure 2:
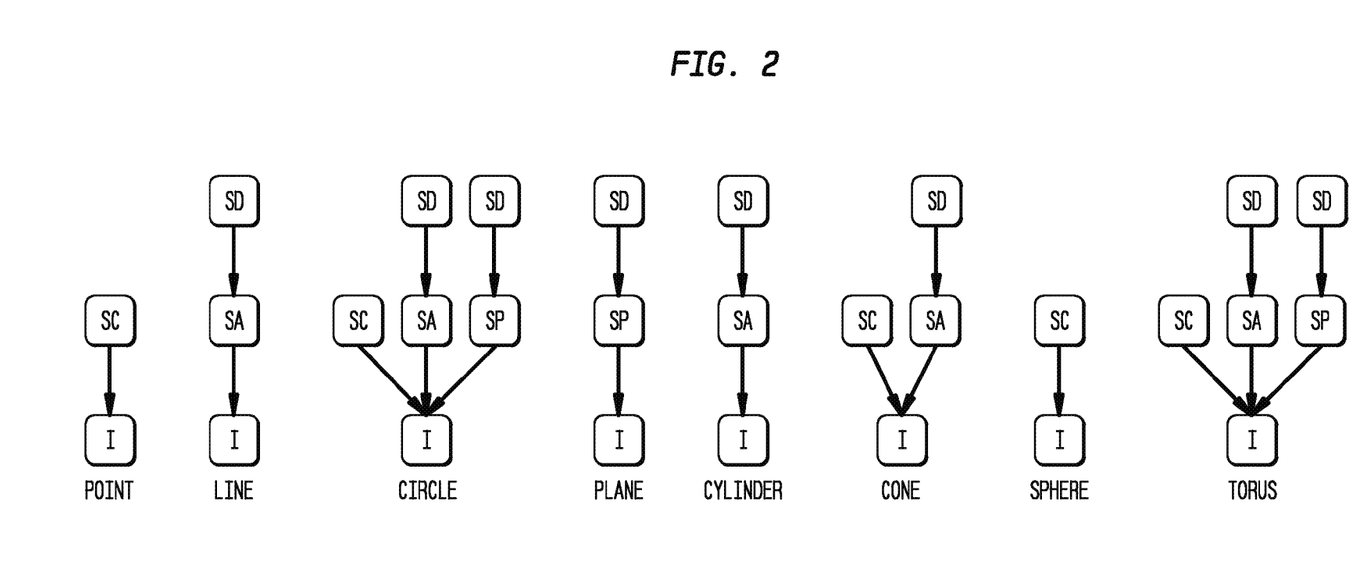
FIG. 2 depicts examples of possible components and their related equivalence relations in accordance with disclosed embodiments.

FIG. 2 depicts examples of possible components and their related equivalence relations described above. This figure illustrates how such structures as a point, line, circle, plane, cylinder, cone, sphere, and torus can be related to other components using various combinations of equivalence relations.

In various embodiments, the hierarchical structure among the equivalence classes can have one or more of the following features:

The relationship defined in a lower level class implies higher level class relations, but these relationships not specifically represented. For example, two planes that are Identical are also Same-plane and Same-direction.

The directed edge from node A to node B can be interpreted as 'B is a member of A' or 'A is a parent of B'.

The terminal nodes of the graph (i.e. the members of the Identical class) are made up of model geometries.

Each terminal node must belong to one and only one Identical class node.

Each class node may belong to multiple ECs with distinctive types, but it can only belong to one class of a certain type.

A product assembly may include multiple basic 3D components, each of which may share various equivalence relations. Each of these assemblies can be represented by a connected graph that shows the equivalence relations between each component type.

Figure 3A:
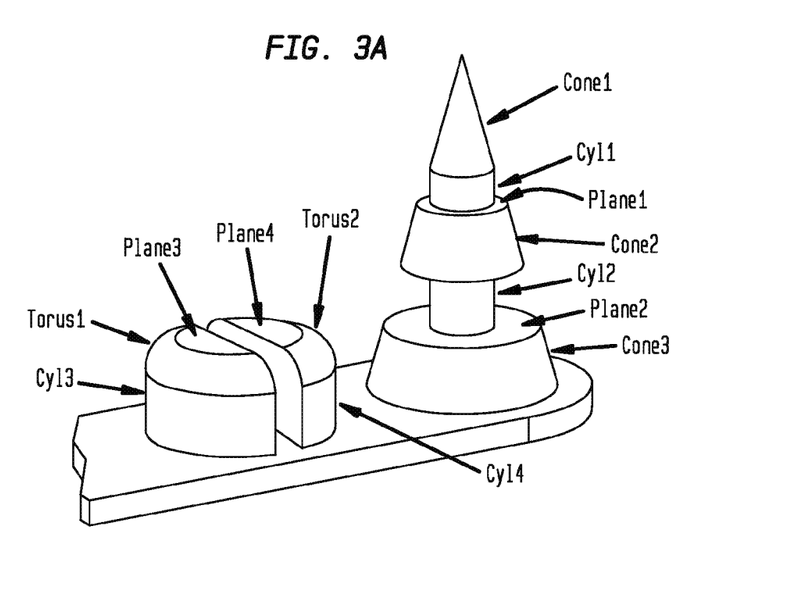
FIG. 3A shows an example of such an assembly comprised of basic components.
Figure 3B:
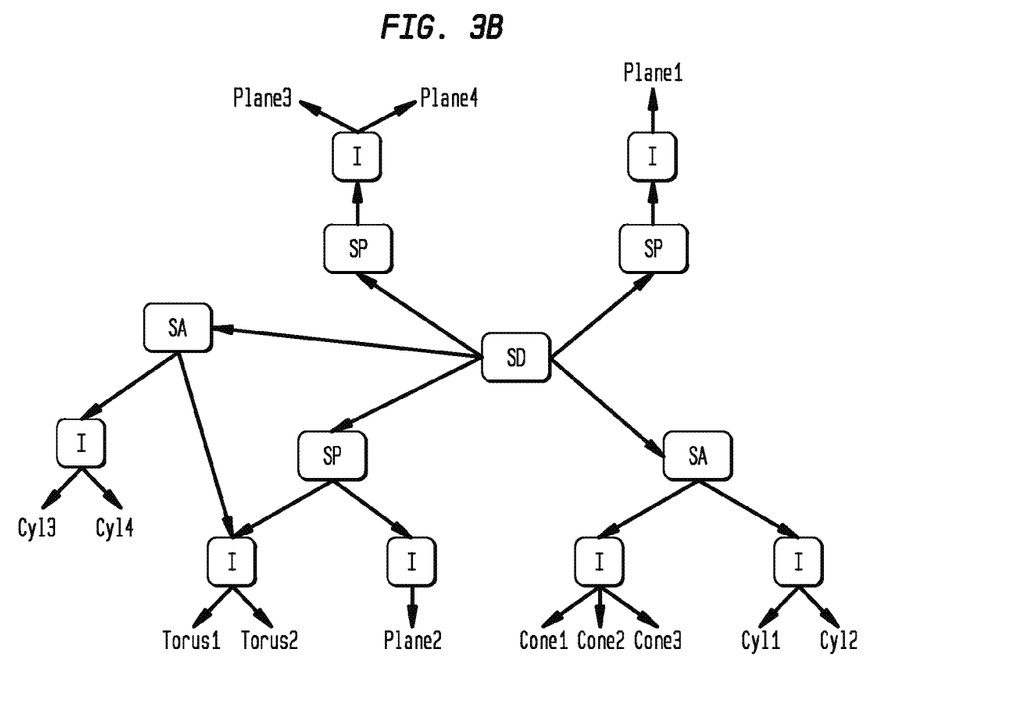
FIG. 3B illustrates a corresponding graph showing equivalence relations between the components of FIG. 3A, both in accordance with disclosed embodiment.

FIG. 3A shows an example of such an assembly comprised of basic components, and FIG. 3B illustrates a corresponding graph showing equivalence relations between the components of FIG. 3A.

Every equivalence class can be represented by a single geometry that stands for the component the class represents. Thus, an equivalence class in geometric terms can be seen both as defining an equivalence relationship between members and providing a single representation of the common component, within the context of other relationships or classes. This single representative geometry is herein called the "head geometry".

Further non-equivalence relationships can then be defined between these head geometries (or between ECs). For example, a "perpendicular" relationship can be defined between the head geometries of two same-direction classes.

Equivalence relations can exist in both local single-part space and global assembly spaces and therefore equivalence classes can also be defined in both spaces. Relationships in the global space are often between entities in different local spaces.

To preserve the equivalence class structure and definitions, various embodiments extend the class hierarchy to include instances of local classes, where the instance contains the transform converting the local space to global space. This extension repeats a local class in the global space with reference to the instance, thus transforming the contents of the class from local space to global space. This allows further global relationships, equivalence or non-equivalence, to be defined making use of this class.

Figure 4:
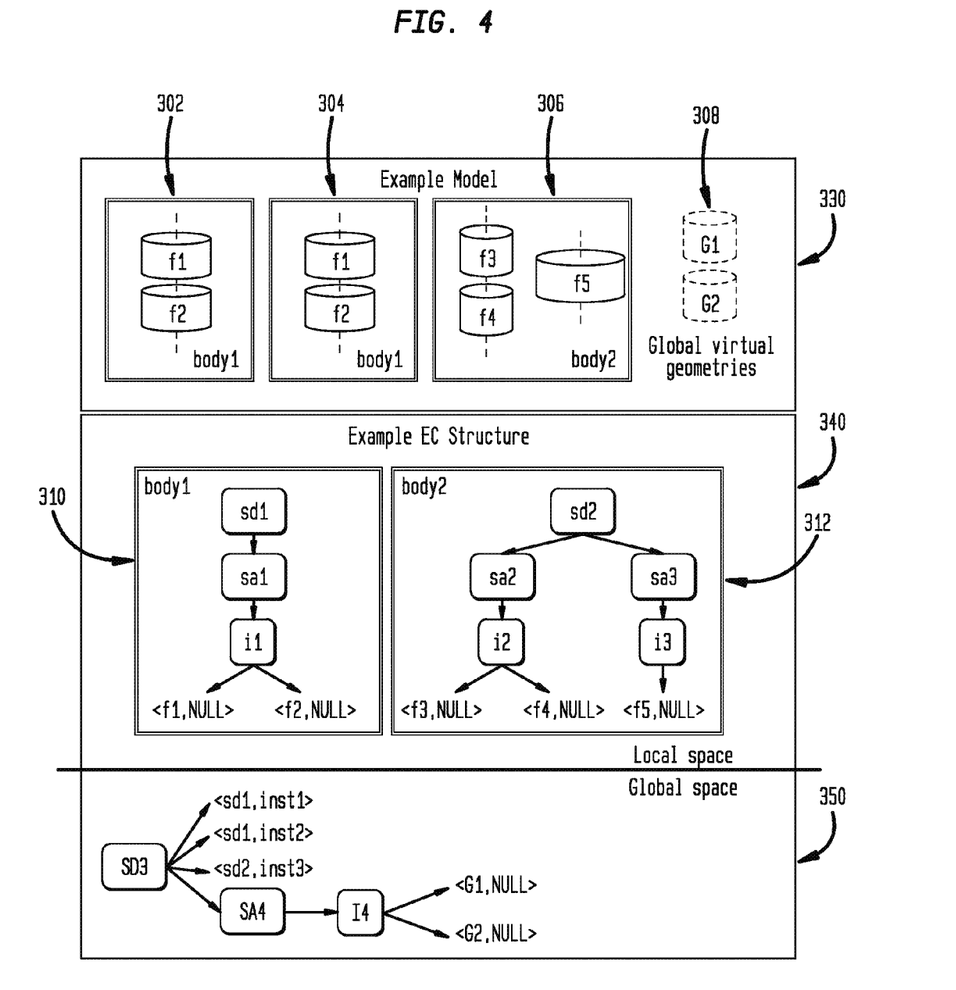
FIG. 4 shows an example of classes in both global and local spaces in accordance with disclosed embodiments.

FIG. 4 shows an example of classes in both global and local spaces. In this example, the example model 330 includes local geometries instance 1 of body 1 302, instance 2 of body 1 304, and instance 3 of body 2 306, and also include global virtual geometries 308.

The local space 340 has two equivalence class structures, for body 1 310 and for body 2 312. Each of the equivalence class structures shows the feature instances of the various local geometry features (f1, f2, etc.) and their equivalence relations.

The global space 350 shows the equivalence relations between the various local geometries 302/304/306 and the global virtual geometries 308.

Use of a hierarchical structure as described herein provides significant technical advantages over traditional binary relationships. The representation completely describes the relationships between all its members. This avoids any need for n-squared binary relationships and the associated memory and performance cost. It also avoids the need to trim down the n-squared links to a minimal set of relationships where all members are related to the first. The minimal set provides the required constraints for model change behavior, but removes valuable information from the structure that can be useful in the processing of other relationships such as symmetry. The representation is also compact and efficient, avoiding duplication of implied information.

Disclosed embodiments include systems and methods for relationship discovery that can efficiently determine a relationship structure as described above. The number of geometric tests theoretically required to discover all relationships within a model increases in proportion to the square of the number of geometries in the model multiplied by the number of geometric relationship types that are required. However, the relationship description defined above enables disclosed embodiments to perform much more efficiently than this.

The description below uses the term "geometrically complete" or "complete" to refer to a type of relationship. A geometry is defined as complete for a type of relationship after it has been checked for that relationship type. Once complete, no more relationships of that type can be found in the model that involve this geometry. Geometric tests are then only performed on geometries that are not complete for a particular type. For equivalence relationships, completeness can be extended to all members of an equivalence class, so if one geometry in an equivalence class is complete, then all geometries within the equivalence class are also complete. For example, if we find a is parallel to b, c, and d then we can mark a, b, c, and d as complete for parallel without needing to do any further parallel checks on b, c, or d.

Further, based on the equivalence hierarchy described above, certain relationship types can be marked as complete without performing any geometric checks based on already-known equivalence relations. For example, if two cylinders are found to be identical, and the first is marked as complete for Identical, Same-axis, and Same-direction, then, the second cylinder can be marked as complete for the same with no further checks.

The system can also store a cache of previously-tested geometries with their associated completion status and any geometric relationships that are found. This ensures checks are only performed once. The cache can also store further information about the relationships found, as may be useful in various implementations.

Disclosed processes can ensure only those geometries in the model that are related to the operation being performed are checked. This avoids, for the majority of cases, completing all tests on all geometries in the model. The cache of geometric relations is therefore progressively expanded from the geometries being edited via a process of propagation driven from the source of the edit.

In various embodiments, only the relevant parts of the cache are converted into user-visible relationships to be kept up-to-date during edits to the model. Only relevant parts of the cache are converted since, due to the bottom-up completion process, in certain cases the cache will contain disjointed areas of graph not related to the specific edit. These relationships are not relevant because they cannot be broken if those areas of the model are not being changed. This can happen, for example, if a user requests perpendicular relationships to be found, which is defined between same-direction classes. To define this relationship both ends must be completed. It is then possible for one of the found perpendicular relationships to be rejected, thus, rendering a large portion of the found relationships not required.

Figure 5:
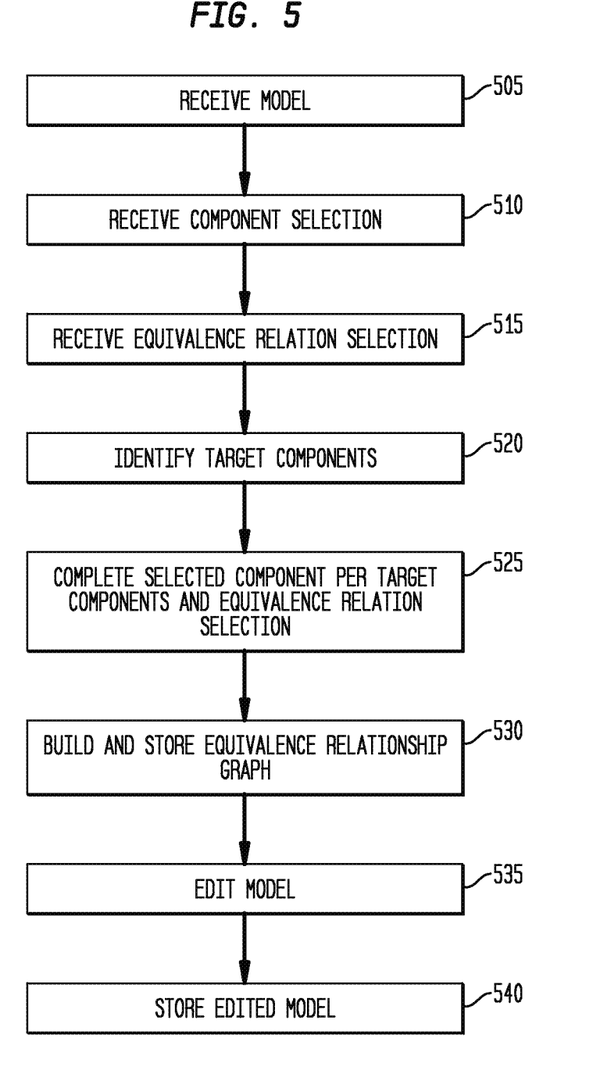
FIG. 5 depicts a flowchart of a process in accordance with disclosed embodiments.
Figure 6A:
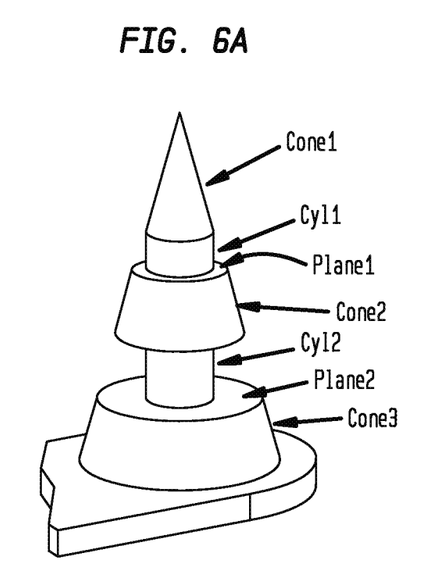
FIG. 6A shows a model with various components and FIG. 6B shows an equivalence relationship structure to be determined using the process of FIG. 5.
Figure 6B:
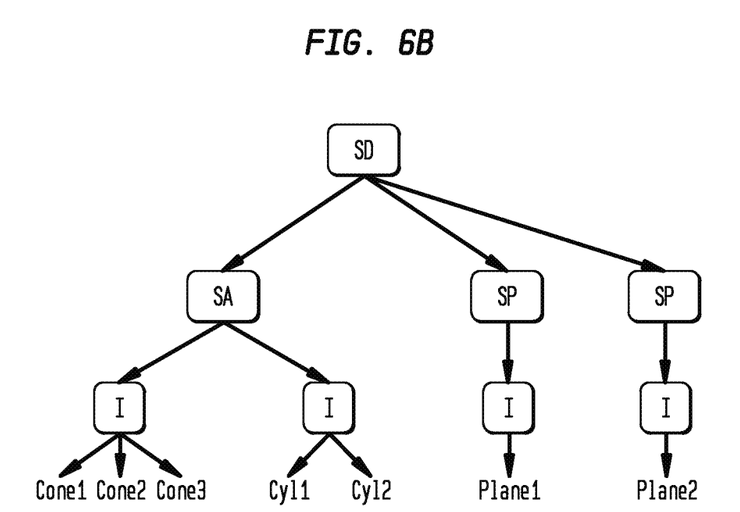

FIG. 5 depicts a flowchart of a process in accordance with disclosed embodiments. For illustrative purposes, this process is described in terms of a specific example; FIG. 6A shows a model with various components and FIG. 6B shows an equivalence relationship structure to be determined using the process of FIG. 5.

The system receives a model (step 505). The "system" can be PDM data processing system as described herein, and the model is 3D model including a plurality of components. "Receiving", as used herein, can include loading from storage, receiving from another device or process, or receiving via an interaction with a user. The model includes the geometries and parameters for each component that enable the characteristics of the components to be compared for the equivalence relationships described herein.

Assume, in this example, that a user is editing a model as shown in FIG. 6A, and wishes to move Cyl1 to the left. The user has also decided that the system should discover and maintain Identical, Same-axis and Same-direction relationships during this edit.

The system receives a selection of a component of the model (step 510). In this example, the system receives the user selection of cylinder Cyl1.

The system receives a selection of one or more equivalence relations to be discovered (step 515). These can include one or more of Identical (I), Same Center (SC), Same Axis (SA), Same Plane (SP), Same Shape (SS), and Same Direction (SD), and this order represents the hierarchy of the relationships from "strongest" to "weakest".

The system "completes" the selected component for the selected set of equivalence relations types against a target component or set of components. In this example assume that the user has selected Identical, Same Axis, and Same Direction equivalence relations, referred to generically below as the first, second, and third relations, in order of decreasing "strength" in the hierarchy.

The system identifies at least one target component in the model that will be compared against the selected component (step 520). In a typical implementation, this will include identifying a set of target components that are a subset of all the components or geometries in the model, and can be, for example, all other components adjacent to the selected component, within a specified bounding distance of the selected component, or in the same assembly or subassembly as the selected component.

The system completes the selected component with respect to each target component according to each selected equivalence relationship (step 525). This step can include several subprocesses.

Subprocesses include determining if the selected component is complete for the first relation, and if not, comparing the selected component to the target component (or next target component) to determine whether they share the first relation. If they do, then they necessarily meet the "weaker" other selected relations. That is, if they are "Identical", then they are also "Same Axis" and "Same direction".

If the selected component and target component do not share the first relation, then the system performs the same determination and comparison for the second equivalence relation, and also complete the target component(s) for the first relation. In the context of this example, the system determines if the selected component is complete for the second relation, and if not, compares the selected component to the target component (or next target component) to determine whether they share the second relation. If they do, then they necessarily meet the "weaker" other selected relations. That is, if they are "Same Axis", then they are also "Same Direction". The system also completes the target components for the "stronger" relations—in this case, it completes the target component for "Identical" relations, since, if the selected component has the "Same Axis" with the target component, it also has the "Same Axis" with other components with which the target component is "Identical".

The same process is repeated for each target component, and each equivalence relation, in the hierarchical order. After each comparison/determination/completion step is processed, the system can store the result, such as in the equivalence relationship graph structure of FIG. 6B, in a cache, or otherwise, so that a process does not need to be repeated. That is, if a component is already complete for "Identical" relations, then the system stores this data so that that component is not again processed for "Identical" relations.

These subprocesses can be performed recursively as the system traverses each target component, each equivalence relation, and each other component identified by those processes.

Based on the completion (at step 525), the system builds and stores an equivalence relationship graph (step 530). The equivalence relationship graph graphically and intuitively represents the equivalence relationships between the components of the model, and may have been built in whole or in part as the completion process was performed. An example of such a graph is shown in FIG. 6B, corresponding to the model of FIG. 6A. Note that this shows cylinder Cyl1 is identical to Cyl2, has the same axis as identical cones Cone1, Cone2, and Cone3, and shares the same direction with Plane1 and Plane2. Any of the storing steps described herein can include storing the relevant data or structure in a memory or storage, such as those shown in FIG. 1. While the term "graph" is used herein, in this context the term "graph" is intended to refer to any structure that maintains the data and relationships as described, unless otherwise specified, and so is not limited to a hierarchical tree graph as depicted.

The system can also identify equivalence class structures based on the determined equivalence relationships.

The system can then receive and make edits to the model according to a user input (step 535). During this step, the system can maintain the discovered equivalence relations selected by the user.

The system can store the edited model (step 540).

A more detailed example process in the context of FIGS. 6A and 6B is described below. Assume again that a user is editing a model as shown in FIG. 6A, and wishes to move Cyl1 to the left. The user has also decided that the system should discover and maintain Identical, Same-axis and Same-direction relationships during this edit.

The system will complete Cyl1 for Identical, Same-axis and Same-direction. This process discovers the following:

Cyl1 and Cyl2 are identical.
Cone1, Cone2 and Cone3 are identical.
Cyl1 shares an axis with Cone1, Cone2 and Cone3.
Cyl1 share a direction with Plane1, and Plane2.

The system marks Cyl1, Cyl2, Cone1, Cone2, and Cone3 as complete for Identical, Same-axis and Same-direction in the cache, graph, or other storage.

The system mark Plane1 and Plane2 as complete for Identical, Same-Plane and Same-Direction in the cache, graph, or other storage.

The system stores the discovered relationships in the cache, graph, or other storage.

The system completes Cyl2, Cone1, Cone2, and Cone3 for Identical, Same-axis and Same-Direction. Since all are already complete, no further relationships are discovered.

From the selected component, the system determines the relationships that are connected and ensures these are preserved as the model is changed. The following relationships are connected to the input in the model of FIG. 6A:

I1 (Cyl1, Cyl2)
I2 (Cone1, Cone2, Cone3)
I3 (Plane1)
I4 (Plane2)
SA1 (I1, I2)
SP1 (I3)
SP2 (I4)
SD (SA1, SP1, SP2)

A basic procedure to complete a single geometry (the selected component) for the given set of relation types (Identical, Same-axis and Same-direction) against a target set of geometries or components is:

1. Collect the target set of geometries, typically a subset of all geometries in the model
2. For each target geometry, compare the input to the target starting with the strongest required relationship:
   2.1. If not complete for Identical compare for Identical, if true stop
   2.2. If not complete for Same-axis compare for Same-axis, if true stop
      2.2.1. Complete target for Identical
   2.3. If not complete for Same-direction compare for Same-direction, if true stop
      2.3.1. Complete target for Identical
      2.3.2. Complete target for Same-axis and Same-plane Of course, those of skill in the art will recognize that, unless specifically indicated or required by the sequence of operations, certain steps in the processes described above may be omitted, performed concurrently or sequentially, or performed in a different order. Steps and operations of the various processes can be combined in various embodiments.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method for maintaining equivalence relations, comprising:
   receiving, in a product data management (PDM) system, a 3D model including a plurality of components;
   receiving, by the PDM system, a selection of one of the plurality of components of the model;
   receiving, by the PDM system, a selection of at least one equivalence relation, from a set of equivalence relations having a defined strength hierarchy, to be discovered in the 3D model;
   identifying, by the PDM system, at least one target component of the plurality of components of the model;
   completing the selected component with respect to each target component, by the PDM system, according to each selected equivalence relation to automatically identify equivalence relationships between the selected component and each target component, wherein the automatic identification of equivalence relationships includes performing a geometric test associated with a strongest selected equivalence relationship in the defined strength hierarchy, and in response to determining the selected component and a target component do not share the strongest selected equivalence relationship, performing a second geometric test on the selected component and the target component, the second geometric test being associated with a next-strongest selected equivalence relationship; and
   building and storing an equivalence relationship graph, by the PDM system, according to the completed selected component, including the identified equivalence relationships.

2. The method of claim 1, wherein the PDM system edits the model while maintaining the selected equivalence relations.

3. The method of claim 1, wherein completing the selected component includes comparing the selected component to each target component with respect to each selected equivalence relation.

4. The method of claim 1, wherein the at least one equivalence relation is one or more of Identical (I), Same Center (SC), Same Axis (SA), Same Plane (SP), and Same Direction (SD).

5. The method of claim 1, wherein the PDM system completes each of the target components according to each selected equivalence relation.

6. The method of claim 1, wherein the at least one equivalence relation is selected from the set of equivalence relations including Identical (I), Same Center (SC), Same Axis (SA), Same Plane (SP), and Same Direction (SD), and the defined strength hierarchy of the equivalence relations is, from strongest to weakest, I, SC, SA, SP, and SD.

7. The method of claim 6, wherein when one equivalence relation is met between any two components of the model, then all weaker equivalence relations are met between those two components.

8. A product data management (PDM) system comprising:
   at least one processor; and
   an accessible memory, the PDM system configured to:
   receive a 3D model including a plurality of components;
   receive a selection of one of the plurality of components of the model;
   receive a selection of at least one equivalence relation, from a set of equivalence relations having a defined strength hierarchy, to be discovered in the 3D model;
   identify at least one target component of the plurality of components of the model;
   complete the selected component with respect to each target component according to each selected equivalence relation to automatically identify equivalence relationships between the selected component and each target component, wherein the automatic identification of equivalence relationships includes performing a geometric test associated with a strongest selected equivalence relationship in the defined strength hierarchy, and in response to determining the selected component and a target component do not share the strongest selected equivalence relationship, performing a second geometric test on the selected component and the target component, the second geometric test being associated with a next-strongest selected equivalence relationship; and build and store an equivalence relationship graph according to the completed selected component, including the identified equivalence relationships.

9. The PDM system of claim 8, wherein the system edits the model while maintaining the selected equivalence relations.

10. The PDM system of claim 8, wherein completing the selected component includes comparing the selected component to each target component with respect to each selected equivalence relation.

11. The PDM system of claim 8, wherein the at least one equivalence relation is one or more of Identical (I), Same Center (SC), Same Axis (SA), Same Plane (SP), and Same Direction (SD).

12. The PDM system of claim 8, wherein the PDM system completes each of the target components according to each selected equivalence relation.

13. The PDM system of claim 8, wherein the at least one equivalence relation is selected from the set of equivalence relations including Identical (I), Same Center (SC), Same Axis (SA), Same Plane (SP), and Same Direction (SD), and the defined strength hierarchy of the equivalence relations is, from strongest to weakest, I, SC, SA, SP, and SD.

14. The PDM system of claim 13, wherein when one equivalence relation is met between any two components of the model, then all weaker equivalence relations are met between those two components.

15. A non-transitory computer-readable medium encoded with computer-executable instructions that, when executed, cause a product data management (PDM) system to:

receive a 3D model including a plurality of components;

receive a selection of one of the plurality of components of the model;

receive a selection of at least one equivalence relation, from a set of equivalence relations having a defined strength hierarchy, to be discovered in the 3D model;

identify at least one target component of the plurality of components of the model;

complete the selected component with respect to each target component according to each selected equivalence relation to automatically identify equivalence relationships between the selected component and each target component, wherein the automatic identification of equivalence relationships includes performing a geometric test associated with a strongest selected equivalence relationship in the defined strength hierarchy, and in response to determining the selected component and a target component do not share the strongest selected equivalence relationship, performing a second geometric test on the selected component and the target component, the second geometric test being associated with a next-strongest selected equivalence relationship; and build and store an equivalence relationship graph according to the completed selected component, including the identified equivalence relationships.

16. The computer-readable medium of claim 15, wherein the PDM system edits the model while maintaining the selected equivalence relations.

17. The computer-readable medium of claim 15, wherein completing the selected component includes comparing the selected component to each target component with respect to each selected equivalence relation.

18. The computer-readable medium of claim 15, wherein the at least one equivalence relation is one or more of Identical (I), Same Center (SC), Same Axis (SA), Same Plane (SP), and Same Direction (SD).

19. The computer-readable medium of claim 15, wherein the PDM system completes each of the target components according to each selected equivalence relation.

20. The computer-readable medium of claim 15, wherein the at least one equivalence relation is selected from the set of equivalence relations including Identical (I), Same Center (SC), Same Axis (SA), Same Plane (SP), and Same Direction (SD), and the defined strength hierarchy of the equivalence relations is, from strongest to weakest, I, SC, SA, SP, and SD, and wherein when one equivalence relation is met between any two components of the model, then all weaker equivalence relations are met between those two components.

* * * * *